US012592219B2

(12) United States Patent
Roeck

(10) Patent No.: US 12,592,219 B2
(45) Date of Patent: Mar. 31, 2026

(54) HEARING DEVICE USER COMMUNICATING WITH A WIRELESS COMMUNICATION DEVICE

(71) Applicant: SONOVA AG, Staefa (CH)

(72) Inventor: Hans-Ueli Roeck, Hombrechtikon (CH)

(73) Assignee: Sonova AG, Staefa (CH)

( * ) Notice: Subject to any disclaimer, the term of this patent is extended or adjusted under 35 U.S.C. 154(b) by 461 days.

(21) Appl. No.: 17/513,614

(22) Filed: Oct. 28, 2021

(65) Prior Publication Data

US 2022/0051660 A1      Feb. 17, 2022

Related U.S. Application Data

(63) Continuation of application No. 16/366,777, filed on Mar. 27, 2019, now Pat. No. 11,195,518.

(51) Int. Cl.
| | |
|---|---|
| *G10L 15/08* | (2006.01) |
| *G06F 3/16* | (2006.01) |
| *G06F 40/205* | (2020.01) |
| *G06F 40/279* | (2020.01) |
| *G06F 40/289* | (2020.01) |
| *H04R 5/027* | (2006.01) |
| *H04R 5/04* | (2006.01) |

(52) U.S. Cl.
CPC .............. *G10L 15/08* (2013.01); *G06F 3/167* (2013.01); *G06F 40/205* (2020.01); *G06F 40/289* (2020.01); *H04R 5/027* (2013.01); *H04R 5/04* (2013.01); *G10L 2015/088* (2013.01); *H04R 2420/07* (2013.01)

(58) Field of Classification Search
CPC ....... G10L 15/26; G10L 15/142; G10L 15/08; G10L 2015/088; G06F 3/167; G06F 40/205; G06F 40/289; G06F 40/279; H04R 5/027; H04R 5/04; H04R 2420/07; H04R 1/1041
See application file for complete search history.

(56) References Cited

U.S. PATENT DOCUMENTS

| | | | |
|---|---|---|---|
| 5,636,285 | A | 6/1997 | Sauer |
| 6,487,534 | B1 | 11/2002 | Thelen |
| 7,483,832 | B2 | 1/2009 | Tischer |
| 9,318,107 | B1 | 4/2016 | Sharifi |
| 9,812,128 | B2 | 11/2017 | Mixter |

(Continued)

*Primary Examiner* — Pierre Louis Desir
*Assistant Examiner* — Kristen Michelle Masters
(74) *Attorney, Agent, or Firm* — ALG Intellectual Property, LLC

(57) ABSTRACT

The disclosed technology relates to conversation between a wireless communication device with a hearing device user. Based on the context of an initiated conversation, an initiating module within the hearing device can send a listening initiator to a speech recognition module within the hearing device, which can use the listening initiator to determine keywords that are potentially applicable in that a context. The speech recognition module within the hearing device can determine whether keywords associated with the context of a conversation are spoken by the user. Accordingly, the hearing device does not need a large vocabulary speech recognition module or computation resources equivalent to a laptop or desktop, which saves power and resources and makes a hearing device integrated keyword detection useful for different contexts.

18 Claims, 3 Drawing Sheets

(56) References Cited

U.S. PATENT DOCUMENTS

| | | | | |
|---|---|---|---|---|
| 9,881,634 B1 | | 1/2018 | Corey | |
| 9,940,928 B2 | | 4/2018 | Haubrich | |
| 10,142,745 B2 | | 11/2018 | Petersen | |
| 10,219,063 B1 | | 2/2019 | Valenzuela | |
| 10,777,189 B1 | * | 9/2020 | Fu | G10L 15/10 |
| 2002/0077830 A1 | * | 6/2002 | Suomela | G06F 3/167 |
| | | | | 704/E15.044 |
| 2005/0043948 A1 | * | 2/2005 | Kashihara | G10L 15/142 |
| | | | | 704/242 |
| 2007/0050191 A1 | | 3/2007 | Weider | |
| 2008/0031475 A1 | | 2/2008 | Goldstein | |
| 2009/0238386 A1 | | 9/2009 | Usher | |
| 2011/0238419 A1 | | 9/2011 | Barthel | |
| 2014/0136195 A1 | * | 5/2014 | Abdossalami | G10L 15/26 |
| | | | | 704/235 |
| 2015/0031086 A1 | | 1/2015 | Heller | |
| 2017/0215011 A1 | | 7/2017 | Goldstein | |
| 2018/0061411 A1 | | 3/2018 | Bhat | |
| 2018/0336901 A1 | * | 11/2018 | Masaki | G10L 15/26 |
| 2019/0149927 A1 | | 5/2019 | Zhang | |
| 2020/0336846 A1 | | 10/2020 | Rohde | |
| 2021/0012374 A1 | | 1/2021 | Gruen | |
| 2021/0075124 A1 | | 3/2021 | Baek | |

* cited by examiner

HEARING DEVICE USER COMMUNICATING WITH A WIRELESS COMMUNICATION DEVICE

RELATED APPLICATIONS

This application is a continuation of U.S. patent application Ser. No. 16/366,777, filed Mar. 27, 2019, which is hereby incorporated by reference herein in its entirety.

BACKGROUND INFORMATION

To increase functionality and user satisfaction, hearing device manufacturers are considering integrating speech recognition into hearing devices. Speech recognition is the ability of a machine or program to identify words or phrases in a spoken language and convert them to machine-readable format. Speech recognition can assist a user in communicating with a machine. However, integrating speech recognition into hearing devices has some difficulties.

One problem is the complexity of speech recognition algorithms and the limited resources on a hearing device. Even hearing devices with significant computational resources have difficulty performing all the computation required for speech recognition in real time. Specifically, there can be a noticeable delay between a time a user has finished speaking and the time the hearing device understands the speech or generates a response. If that time delay is too large, the usefulness of speech recognition is reduced.

Additionally, a hearing device has limited battery, limited processing resources, and limited memory resources compared to a large computer (e.g., personal computer) to run complex speech recognition algorithms. For example, if a hearing device is frequently running a speech recognition algorithm, it will use a significant amount of power and the user will quickly need to recharge the hearing device or insert a new battery, which is an inconvenience for the user.

Another problem with speech recognition in hearing devices is accuracy. In general, as the number of utterances that a speech recognition hearing device is programmed to recognize increases, the accuracy that it distinguishes among those utterances decreases because the probability of error increases with increasing computations. Here, an utterance is a spoken input from a user. An utterance may be a single word, an entire phrase, a sentence, or even several sentences.

Another problem is speech recognition generally requires a large vocabulary and hearing devices have limited memory for storing the large vocabulary and limited processing power for searching the large vocabulary. A vocabulary database can include all the words in a specified language, plurals, and all conjugations of verbs (regular and irregular). This generally requires a powerful processor.

Accordingly, there exists a need for a hearing device or method that improves speech recognition for a hearing device and provides additional benefits.

SUMMARY

This summary is provided to introduce a selection of concepts in a simplified form that are further described below in the Detailed Description. This summary is not intended to identify key features of the claimed subject matter.

The disclosed technology can include a hearing device configured to be worn by a user, the hearing device can comprise: a microphone configured to convert sound into audio signals; a processor configured to process the audio signals received from the microphone; a memory, electronically coupled to the processor, the memory storing instructions that cause the hearing device to perform operations.

The operations can comprise: receiving (e.g., from a software module in hearing device or from a wireless communication device) a listening initiator with context-information that prompts the hearing device to listen for sound and convert received sound into audio signals at the hearing device. Further, the operations can comprise accessing in the memory of the hearing device, a keyword associated with an utterance based on the context-information of the listening initiator, wherein the keyword is derived from a limited set of elements associated with the context-information. Further, the operations can comprise: analyzing by the processor, the audio signals to determine whether the keyword associated with the utterance is included in the sound; and transmitting a notice to the wireless communication device that the keyword was included in the sound.

The operations can further comprise: determining that the time limit has expired; and turning off speech recognition. The hearing device can store the operations in a memory of the hearing device, e.g., on a non-transitory computer-readable medium.

In some implementations, the context-information is associated with a phone call, email, program running on the wireless communication device, or text message. For example, the listening initiator and the context-information can be associated with a phone call received at the wireless communication device, wherein the only allowed keywords are "accept" and "reject".

Figure 1:
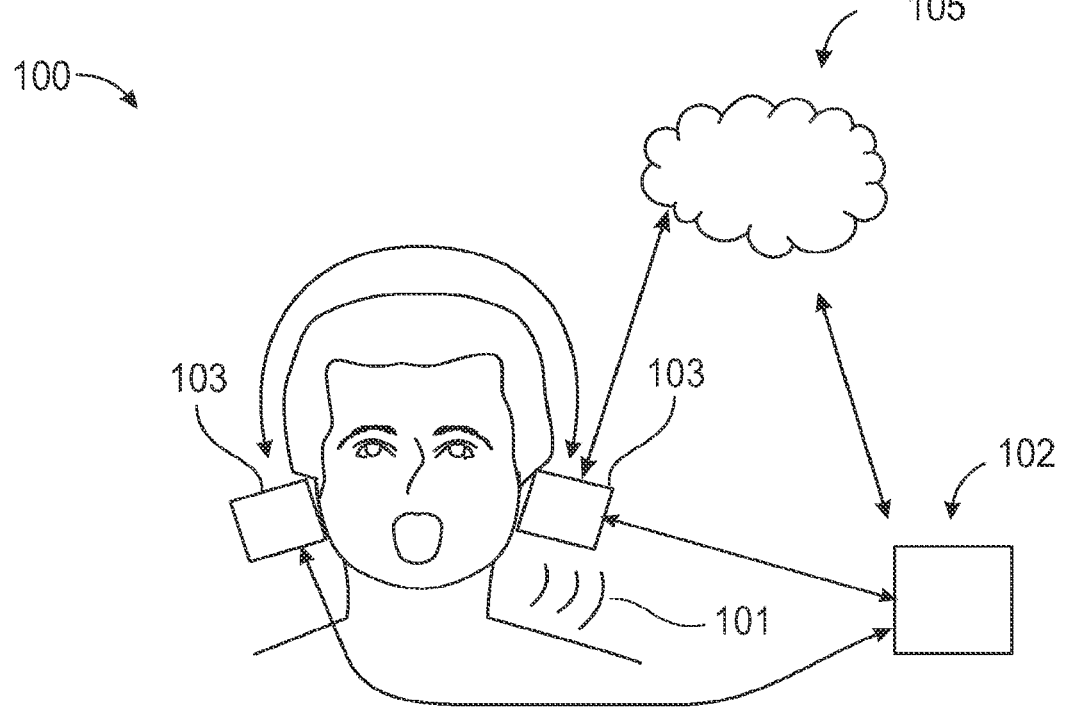
FIG. 1 illustrates a communication environment in accordance with some implementations of the disclosed technology.

The drawings are not to scale. Some components or operations may be separated into different blocks or combined into a single block for the purposes of discussion of some of the disclosed technology. Moreover, while the technology is amenable to various modifications and alternative forms, specific implementations have been shown by way of example in the drawings and are described in detail below. The intention, however, is not to limit the technology to the selected implementations described. Rather, the disclosed technology is intended to cover all modifications, equivalents, and alternatives falling within the scope of the technology as defined by the appended claims.

DETAILED DESCRIPTION

The disclosed technology generally relates to a hearing device user communicating with a wireless communication device.

The disclosed technology relates to a hearing device user communicating with a wireless communication device. A hearing device user is a person wearing or using a hearing device (e.g., hearing aid). For example, a hearing device user can respond to a phone call received at his mobile phone by stating "accept" or "reject" when he hears the ringtone provided by the phone. Prior to the hearing device user verbally responding to the phone call, the hearing device can begin listening for a user's response and anticipate what words the user is likely to say in response to hearing the ring tone.

To enable the hearing device user to communicate with a wireless communication device, the hearing device can use keyword recognition. Keyword recognition refers to spotting or identifying a keyword or keywords in utterances of speech (from the hearing device user). The hearing device can use a keyword identified by keyword recognition to index, look up, or perform operations in the hearing device. A keyword can be a single word, a phrase, or multiple words. Some examples of keywords are "accept", "reject", "respond later", "I'm busy", "ask them to call back later", "read the email aloud", "read the text to me", "respond to the text 'yes'", or "respond to the email".

However, instead of using algorithms that attempt to recognize all utterances of speech and search for many keywords, the hearing device implements an algorithm that limits the utterances it recognizes based on the context of a conversation with the wireless communication device. Specifically, the hearing device activates limited keyword recognition when it receives a listening initiator from a wireless communication device, wherein the listening initiator is associated with keywords. A listening initiator is a message generated by either a wireless communication device that is transmitted from the wireless communication device to the hearing device or the message generated is in the hearing device itself and the message includes a perceivable (e.g., audible, haptic) notification to the user, and thus an implicit request that the hearing device begins listening to a hearing device user's response. For example, a mobile phone can transmit a message from the mobile phone to a hearing device via Bluetooth™ that indicates a hearing device should begin listening to a user's speech as related to responding to a phone call. Another example notifies the user that the battery is near empty due to excessive audio streaming and that it is recommended to conserve some energy by stopping the music stream. Here, some keywords can be "OK", "stop", "proceed", or "I don't care".

Additionally, the listening initiator can be associated with context-information that relates to a context of conversation between the hearing device user and the wireless communication device or situation where the hearing device is being used. Context-information is information about the circumstances of a conversation related to the listening initiator. Some examples of context-information can include the type of request (e.g., phone call) and information about the request (e.g., who is calling). If the listening initiator is generated internally in the hearing device, the context-information can refer to the classification of sound (e.g., speech, waiting for a command from the hearing device user, volume change request).

A hearing device can use the context-information to look up keywords and associated utterances for those keywords. For example, if the hearing device determines that the context-information for a listening initiator is related to a phone call, the hearing device can identify utterances associated with "accept" and "reject" prior to the user speaking based on a set of limited keywords stored in its memory, where the limited set of keywords is associated with keywords for phone calls. As another example, a phone call may be from a spouse of the hearing device user and the phone may have a specific ringtone for the spouse; accordingly, the hearing device can listen for the spouse's name (e.g., "call back my Amy later"). If the user verbally responds to the phone call, the hearing device can use the identified utterances to determine if the user said accept, reject, or whether the user also uttered the name of his or her spouse.

In some implementations, the disclosed technology has a technical benefit or addresses a technical problem for speech recognition performed by a hearing device. For example, the hearing device can reduce the complexity implemented of the speech recognition algorithms because the hearing device uses context-information to limit keywords and utterances that it recognizes. Limiting the number of keywords or utterances reduces the complexity and required resource usage of a speech recognition algorithm and increases the speed in which the hearing device can complete the task. The hearing device can increase the accuracy in speech recognition because the number of utterances a hearing device must accurately identify is reduced and the probability of identifying within a context increases accuracy as compared to without a context.

Additionally, the disclosed technology enables a wireless communication device to start a conversation with or request a response from a hearing device user without initiating the conversation with a trigger word (e.g., "hello Siri"; "hello Google"); rather, the wireless communication device initiates the conversation even if the user is unaware or has not requested the conversation to start. The hearing device and the wireless device are predictive and anticipate a hearing device user's intention.

FIG. 1 illustrates a communication environment 100. The communication environment 100 includes wireless communication devices 102 (singular "wireless communication device 102" and multiple "wireless communication devices 102") and hearing devices 103 (singular "hearing device 103" or multiple "hearing devices 103"). FIG. 1 also shows a user speaking, which generates sound waves 101.

As shown by double-headed bold arrows in FIG. 1, the wireless communication devices 102 and the hearing devices 103 can communicate wirelessly, e.g., each wireless communication device 102 can communicate with each hearing device 103 and each hearing device 103 can communicate with the other hearing device. Wireless communication can include using a protocol such as Bluetooth BR/EDR™, Bluetooth Low Energy™ a proprietary communication (e.g., binaural communication protocol between hearing aids based on NFMI or bimodal communication protocol between hearing devices), ZigBee™, Wi-Fi™, or an Industry of Electrical and Electronic Engineers (IEEE) wireless communication standard. The wireless communication devices 102 and the hearing devices 103 can exchange information related to keywords, speech, conversation or listening initiators (see FIG. 2), or other information for communicating between the hearing device user and the wireless communication device.

The wireless communication devices 102 are computing devices that are configured to wirelessly communicate. Wireless communication includes wirelessly transmitting information, wirelessly receiving information, or both. The wireless communication devices 102 shown in FIG. 1 can include mobile computing devices (e.g., mobile phone), computers (e.g., desktop or laptop), televisions (TVs) or components in communication with television (e.g., TV streamer), a car audio system or circuitry within the car, tablet, an accessory electronic device, a wireless speaker, or watch. The wireless communication devices 102 can be configured to perform speech recognition algorithms or natural language processing algorithms with higher complexity, either standalone or in combination with a cloud based service.

A hearing device user can wear the hearing devices 103 and the hearing device provides audio to a hearing device user. For example, a hearing device user can wear single hearing device 103 or two hearing devices, where one hearing device 103 is on each ear. Some example hearing devices include hearing aids, headphones, earphones, assistive listening devices, or any combination thereof; and hearing devices include both prescription devices and non-prescription devices configured to be worn on or near a human head. As an example of a hearing device, a hearing aid is a device that provides amplification, attenuation, or frequency modification of audio signals to compensate for hearing loss or difficulty; some example hearing aids include a Behind-the-Ear (BTE), Receiver-in-the-Canal (RIC), In-the-Ear (ITE), Completely-in-the-Canal (CIC), Invisible-in-the-Canal (IIC) hearing aids or a cochlear implant (where a cochlear implant includes a device part and an implant part).

The hearing devices 103 are configured to binaurally communicate or bimodally communicate. The binaural communication can include a hearing device 103 transmitting information to or receiving information from another hearing device 103. Information can include volume control, signal processing information (e.g., noise reduction, wind canceling, directionality such as beam forming information), or compression information to modify sound fidelity or resolution. Binaural communication can be bidirectional (e.g., between hearing devices) or unidirectional (e.g., one hearing device receiving or streaming information from another hearing device). Bimodal communication is Ike binaural communication, but bimodal communication includes two devices of a different type, e.g. a cochlear device communicating with a hearing aid. The hearing device can communicate to exchange information related to utterances or speech recognition.

The network 105 is a communication network. The network 105 enables the hearing devices 103 or the wireless communication devices 102 to communicate with a network or other devices. The network 105 can be a Wi-Fi™ network, a wired network, or e.g. a network implementing any of the Institute of Electrical and Electronic Engineers (IEEE) 802.11 standards. The network 105 can be a single network, multiple networks, or multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. In some implementations, the network 105 can include communication networks such as a Global System for Mobile (GSM) mobile communications network, a code/time division multiple access (CDMA/TDMA) mobile communications network, a 3rd, 4th or 5th generation (3G/4G/5G) mobile communications network (e.g., General Packet Radio Service (CPRS)) or other communications network such as a Wireless Local Area Network (WLAN). Also, in some implementations, the network 105 can communicate with the wireless communication devices 102 to perform operations such as large complexity speech recognition operations such as natural language processing. For example, the wireless communication device 102 can off-load some speech recognition operations onto the computers in the network 105.

Figure 2:
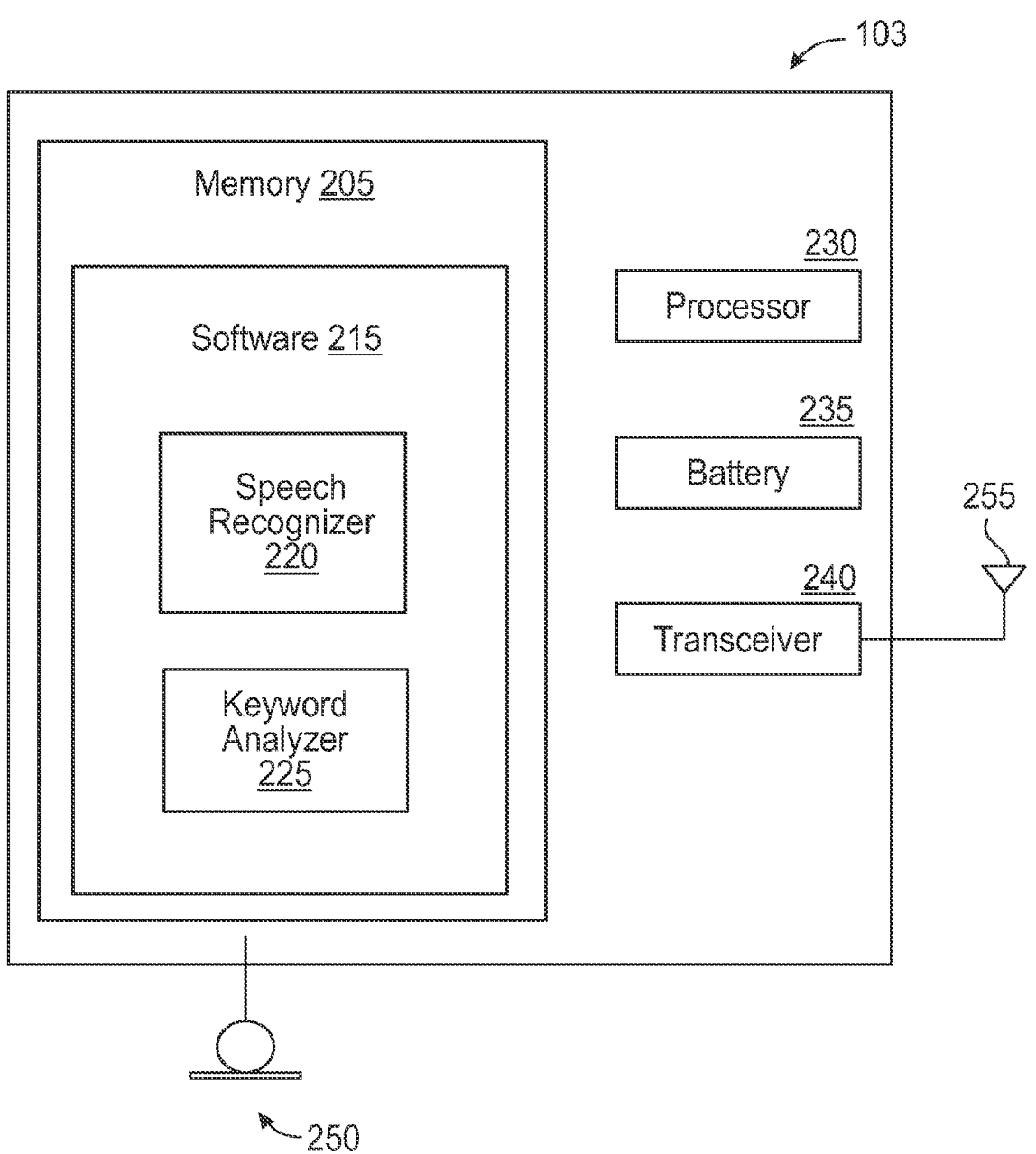
FIG. 2 illustrates a hearing device from FIG. 1 in more detail in accordance with some implementations of the disclosed technology.

FIG. 2 is a block diagram illustrating the hearing device 103 from FIG. 1 in more detail. FIG. 2 illustrates the hearing device 103 with a memory 205, software 215 stored in the memory 205. The software 215 includes a speech recognizer 220 and a keyword analyzer 225. In some implementations, the speech recognizer 220 and the keyword analyzer 225 are combined into one module, which is also referred to as the "software module" or "module". In FIG. 2, the hearing device 103 also has a processor 230, a battery 235, a transceiver 240 coupled to an antenna 255, and a microphone 250. Each of these components is described below in more detail.

The memory 205 stores instructions for executing the software 215 comprised of one or more modules and data utilized by the modules. The modules perform certain methods or functions for the hearing device 103 and can include components, subcomponents, or other logical entities that assist with or enable the performance of these methods or functions. Although a single memory 205 is shown in FIG. 2, the hearing device 103 can have multiple memories 205 that are partitioned or separated, where each memory can store different information.

The speech recognizer 220 can recognize the speech a of hearing device user. The speech recognizer 220 can use speech recognizing algorithms that identify words or phrases in spoken language and convert them to a machine-readable format. The speech recognizer 220 can use acoustic and language modeling. Acoustic modeling includes an algorithm that determines the relationship between linguistic units of speech and audio signals (e.g., as received from a microphone that records a user speak). The language modeling matches linguistic units to word sequences to help distinguish between words that sound similar. The speech recognizer can also use algorithms that include hidden Markov Models to recognize temporal patterns in speech to improve accuracy. The speech recognizer 220 can also store algorithms such as Dynamic Time Wrapping or Neural Networks algorithms for recognizing speech and translating it to machine-readable language (e.g., the hearing device can interpret the signals associated with the speech).

In some implementations, the speech recognizer 220 can be trained to incorporate speaker-dependent information such as how they pronounce certain words. For example, the speech recognizer 220 can train its modules based on a hearing device user's voice, speech patterns, or other characteristics of the user's voice. The training may only be completed for a limited number of keywords associated with context-information. For example, the hearing device may only train for answering phone calls, answering emails or text messages.

The keyword analyzer 225 can communicate with the speech recognizer 220 to determine if the user said a word, words, or a phrase based on a context-information. In some implementations, the keyword analyzer 225 access a set of limited keywords in the memory 205, wherein the set of limited keywords is associated with the context-information. Table 1 below includes examples of how the keyword analyzer 225 can use the context-information associated with a listening initiator to identify specific keywords spoken by a user applicable in that context. As shown in Table 1, context information relates to the context of a situation (e.g., phone call) and the hearing device can associate additional information with the context such as how long to listen for keywords. The keyword analyzer 225 can communicate this information to the speech recognizer 220 or the processor 230 to assist in determining whether speech from a hearing device user included certain keywords.

TABLE 1

| Context-information | Keywords | Additional context-information associated the listening initiator |
|---|---|---|
| Phone call | Accept, reject, answer, do not answer, call back later, busy | Listen for at least 10 seconds |
| Request response to SMS | I'm driving, I will call you later, sounds good, thank you, I'm coming home soon, talk soon, yes, no | Listen for at least 10 seconds, but not longer than 25 |
| Request response to email | I'm out of the office until [date], I will call you later, sounds good, thank you, talk soon, yes, no | Listen for at least 10 seconds, but not longer than 25 |
| Battery low warning due to excessive audio streaming | Proceed, I don't care, stop playing, save power | Listen for at least 10 seconds |
| Notification from a fall detection function ("Attention: Fall detected. Automatic alarm will be issued in 60 seconds if not canceled") | Help, cancel, I'm OK, ah (sound associated with pain) | Listen for at least 60 seconds |

In some implementations, the context-information can also be determined locally on the hearing device 103. For example, the hearing device 103 can receive a tap or touch from the hearing device user on the hearing device. The hearing device 103 can detect a tap based on a signal from an accelerometer. The hearing device can store contexts associated with taps. For example, the hearing device 103 can store in memory that the tapping is associated with adjusting volume up or down. In accordance, the hearing device can determine that the user wants to change the volume of their hearing device; in response, the hearing device can listen for keywords such as "turn down", "turn up", "too loud", or "too soft" and in response to these keywords the hearing device can take an action. If the tap occurs during music streaming, additional relevant keywords are e.g. "Pause", "Resume", "Forward" "Repeat". I.e. there is no need for a general 'attention' keyword such a "Hey Siri", if the context is already known.

The processor 230 can include special-purpose hardware such as application specific integrated circuits (ASICs), programmable logic devices (PLDs), field-programmable gate arrays (FPGAs), programmable circuitry (e.g., one or more microprocessors microcontrollers), Digital Signal Processor (DSP), Neural network engines, appropriately programmed with software and/or computer code, or a combination of special purpose hardware and programmable circuitry. For example, neural network engines might be analog or digital in nature and contain single or multiple layers of feedforward or feedback neuron structures with short and long-term memory and/or different nonlinear functions.

Also, although the processor 230 is shown as a separate unit in FIG. 2, the processor 230 can be on a single chip with the transceiver 240, the controller 245, and the memory 205. The processor 230 can also include a DSP configured to modify audio signals based on hearing loss or hearing programs stored in the memory 205. In some implementations, the hearing device 103 can have multiple processors, where the multiple processors can be physically coupled to the hearing device 103 and configured to communicate with each other.

The battery 235 can be a rechargeable battery (e.g., lithium ion battery) or a non-rechargeable battery (e.g., Zinc-Air) and the battery 235 can provide electrical power to the hearing device 103 or its components. In general, the battery 235 has significantly less available capacity than a battery in a larger computing device (e.g., a factor 100 less than a mobile phone device and a factor 1000 less than a laptop).

The microphone 250 is configured to capture sound and provide an audio signal of the captured sound to the processor 230. The microphone 250 can also convert sound into audio signals. The processor 230 can modify the sound (e.g., in a DSP) and provide the processed audio derived from the modified sound to a user of the hearing device 103. Although a single microphone 250 is shown in FIG. 2, the hearing device 103 can have more than one microphone. For example, the hearing device 103 can have an inner microphone, which is positioned near or in an ear canal, and an outer microphone, which is positioned on the outside of an ear. As another example, the hearing device 103 can have two microphones, and the hearing device 103 can use both microphones to perform beam forming operations. In such an example, the processor 230 would include a DSP configured to perform beam forming operations.

The antenna 255 is designed or configured to operate in unlicensed bands such as Industrial, Scientific, and Medical Band (ISM) using a frequency of 2.4 GHz. The antenna 255 can also be configured to operation in other frequency bands such as 5.8 GHz, 3.8 MHz, 10.6 MHz, or other unlicensed bands.

Although not shown in FIG. 2, the hearing device 103 can include additional components. For example, the hearing device can also include a transducer to output audio signals (e.g., a loudspeaker or a transducer for a cochlear device configured to convert audio signals into nerve stimulation or electrical signals). Further, although not shown in FIG. 2, the hearing device can include sensors such as an accelerometer, a gyroscope, a photoplethysmogram sensor, or other sensors configured to detect health conditions regarding the user wearing the hearing device 103.

Also, the hearing device 103 can include an own voice detection unit configured to detect a voice of the hearing device user and separate such voice signals from other audio signals. To implement detecting own voice, the hearing device can include a second microphone configured to convert sound into audio signals, wherein the second microphone is configured to receive sound from an interior of an ear canal and positioned within the ear canal, wherein a first microphone is configured to receive sound from an exterior of the ear canal. The hearing device can also detect own voice of a hearing device user based on other implementations (e.g., a digital signal processing algorithm that detects a user's own voice).

Figure 3:
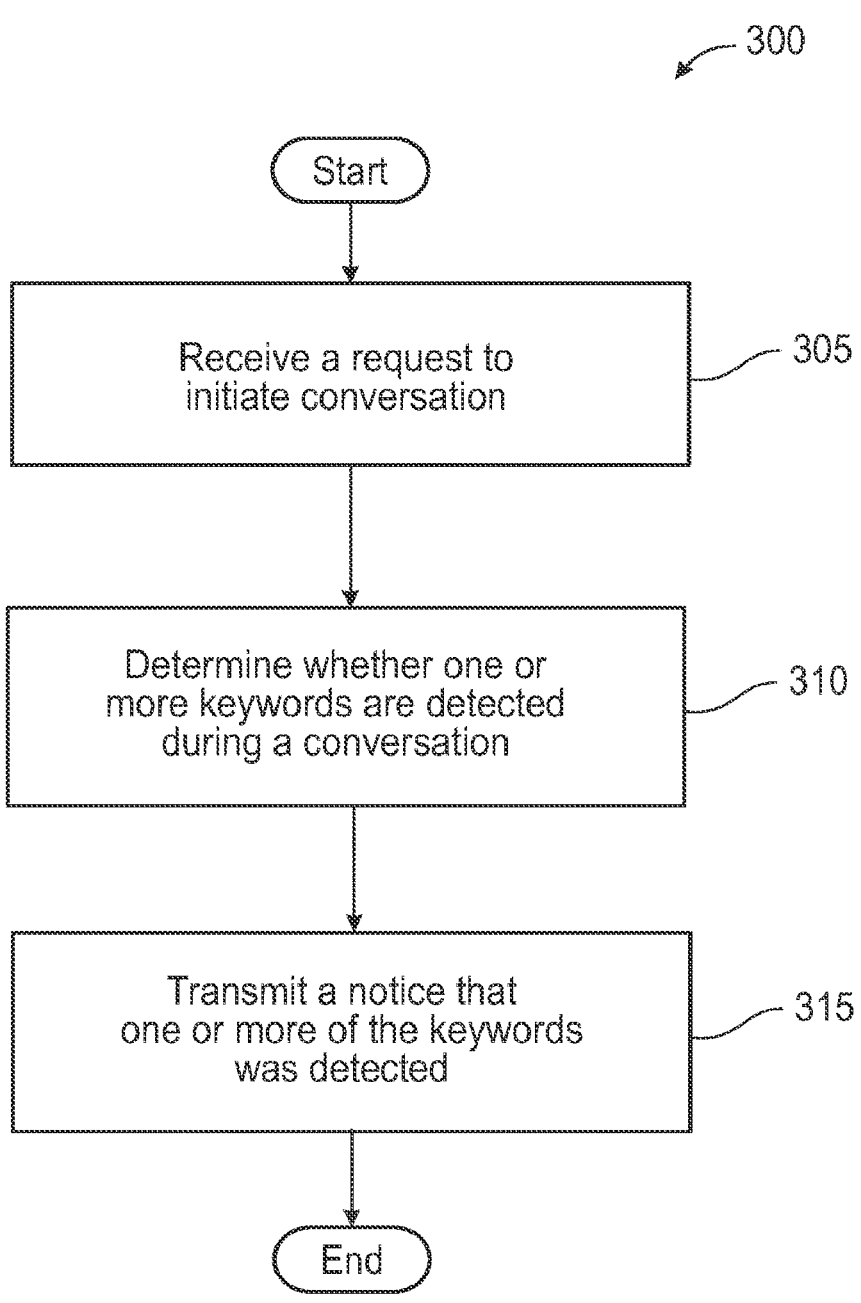
FIG. 3 illustrates a block flow diagram for improving conversation between a wireless communication device and a hearing device based on context in accordance with some implementations of the disclosed technology.

FIG. 3 illustrates a block flow diagram for a process 300 for a hearing device user to communicate with a wireless communication device using a hearing device. The hearing device 103 may perform part or all of the process 300. The process 300 begins with conversation initiation operation 305 and continues with detect keyword operation 310.

At receive a request to initiate listening 305, the hearing device 103 can receive a request from a wireless communication device or from an internal component or software module to begin listening to speech commands. More specifically, the request can cause the hearing device 103 to listen for comments, requests, or responses from the hearing device user. Specifically, a wireless communication device or an internal module can transmit a listening initiator with context-information. The hearing device can use the context-information to determine which keywords to listen for and/or a time period to listen for based on the context information.

At determine keyword operation 310, the hearing device 103 determines whether a keyword or keywords are included in the speech from the hearing device user during a certain time period. The hearing device 103 can convert sound into audio signals using its microphone. The hearing device can then use speech recognition algorithms to detect utterances associated with keywords in the audio signals. To efficiently determine whether a keyword or keywords are included in the audio signals, the hearing device can use the context-information associated with the listening initiator to select potentially applicable keywords. For example, the listening initiator can be associated with a phone call and the context information can include the person that is calling. The hearing device can determine that "accept", "reject", "answer", or "do not answer" as the likely keywords for phone calls. Accordingly, the hearing device can listen for these words for at least 5 seconds after receiving the listening initiator.

As another example, the hearing device can receive a listening initiator from a mobile device related to a Short Message Service (SMS) message or multimedia text message. The context information can include that the message is an SMS message, the name of the person who sent the message, and if there are any requests in the SMS (e.g., call me back, confirm a schedule). Once the hearing device receives the listening initiator and the context-information associated with the text message, it can use this information to select only those keywords associated with the context of receiving a text message as input into the keyword recognizer. The hearing device can then determine the keywords may be the user stating, "I will call you", "confirm", "I can't answer now because I'm driving", "sounds good".

At transmit notification operation 315, the hearing device 103 can transmit a message to the software module, the message containing information about which keyword was detected. This software module is then able to interpret such information and act accordingly. For example, if a ring tone Indicates an incoming phone call to the user, an 'accept' keyword can be used by the hearing aid to open a Bluetooth phone connection (HFP profile) to start the phone call.

In another example, after a detecting a fall and a respective notification, the hearing device can listen for "help" as a keyword to trigger a message to generate an alarm or emergency call (e.g., emergency call to a care taker or a blue-light emergency service without waiting for the entire grace period to cancel an automatic alarm).

After transmit notification operation 315, the process 300 can be repeated entirely, repeated partially (e.g., repeat only operation 310), or stop. For example, the hearing device determines that is has finished listening to a hearing device user, the hearing device can discontinue speech recognition operations or it can return the speech recognition operations to detect further keywords which might be appropriate in the further narrowed context as given by the first keyword.

Aspects and implementations of the process 300 of the disclosure have been disclosed in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware such with a wireless communication device or a hearing device.

The phrases "in some implementations," "according to some implementations," "in the implementations shown," "in other implementations," and generally mean a feature, structure, or characteristic following the phrase is included in at least one implementation of the disclosure, and may be included in more than one implementation. In addition, such phrases do not necessarily refer to the same implementations or different implementations.

The techniques introduced here can be embodied as special-purpose hardware (e.g., circuitry), as programmable circuitry appropriately programmed with software or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory excludes a propagating signal.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in an order, alternative implementations may perform routines having steps, or employ systems having blocks, in a different order, and some processes or blocks may be deleted, moved, added, subdivided, combined, or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. As another example, "A or B" can be only A, only B, or A and B.

What is claimed is:

1. A hearing device comprising:
a processor;
a voice detection unit configured to detect a voice of a hearing device user and identify voice signals generated based on the voice of the hearing device user from other audio signals; and a memory storing instructions that cause the processor to perform operations, the operations comprising:

receiving a listening initiator with context-information that prompts the hearing device to convert received sound into audio signals, the context-information limiting keywords that the hearing device recognizes in a given context;

determining that the context-information includes first context-information, the first context-information associated with a first time period for listening for a keyword;

accessing, based on the first context-information of the listening initiator, the keyword that is associated with an utterance by the hearing device user and that is derived from a limited set of elements associated with the first context-information; and analyzing, using a speech recognizer module and during the first time period, the audio signals to determine whether the keyword associated with the utterance is included in the received sound, wherein:

the speech recognizer module only recognizes a limited number of keywords associated with the first context-information and the first time period;

the hearing device uses the context-information to determine keywords to listen for and a time period to listen for based on the context-information;

the hearing device determines whether a specific keyword or keywords are included in speech of the hearing device user during a certain time period; and the hearing device is predictive and anticipates intentions of the hearing device user.

2. The hearing device of claim 1, wherein the operations further comprise transmitting a notice that the keyword was included in the received sound.

3. The hearing device of claim 1, wherein the first context-information is associated with a phone call, an email, a program running on a wireless communication device having a service level connection with the hearing device, a text message, or a hearing device internal state.

4. The hearing device of claim 3, wherein the listening initiator and the first context-information are associated with a phone call received at the wireless communication device, wherein the keyword is accept or reject.

5. The hearing device of claim 1, wherein the operations further comprise:

determining that the first time limit has expired; and turning off speech recognition.

6. The hearing device of claim 1, further comprising a transceiver configured to communicate with a wireless communication device.

7. The hearing device of claim 1, further comprising:

a first microphone configured to convert sound into the audio signals; and a second microphone configured to convert sound into additional audio signals, wherein the second microphone is configured to receive sound from an interior of an ear canal and is positioned within the ear canal, and wherein the first microphone is configured to receive sound from an exterior of the ear canal.

8. A method for a wireless communication device to communicate with a hearing device, the method comprising:

detecting, by a voice detection unit, a voice of a hearing device user, the voice detection unit configured to identify voice signals generated based on the voice of the hearing device user from other audio signals;

receiving a listening initiator with context-information that prompts the hearing device to convert received sound into audio signals, the context-information limiting keywords that the hearing device recognizes in a given context;

determining that the context-information includes first context-information, the first context-information associated with a first time period for listening for a keyword;

accessing, in a memory of the hearing device and based on the first context-information of the listening initiator, the keyword associated with an utterance of the hearing device user; and analyzing, by a processor of the hearing device during the first time period and using a speech recognizer module, the audio signals to determine whether the keyword associated with the utterance is included in the received sound, wherein:

the speech recognizer module only recognizes a limited number of keywords associated with the first context-information and the first time period;

the hearing device uses the context-information to determine keywords to listen for and a time period to listen for based on the context-information;

the hearing device determines whether a specific keyword or keywords are included in speech of the hearing device user during a certain time period; and the hearing device is predictive and anticipates intentions of the hearing device user.

9. The method of claim 8, further comprising transmitting a notice that the keyword is included in the received sound.

10. The method of claim 8, wherein:

the keyword is a first keyword;

the utterance is a first utterance; and the method further comprises:

analyzing the audio signals to determine whether the first keyword and a second keyword associated with a second utterance are included in the received sound.

11. The method of claim 8, wherein accessing the keyword associated with the utterance includes using the first context-information to perform a lookup operation in the memory of the hearing device.

12. The method of claim 8, wherein analyzing the audio signals further comprises:

detecting a voice signal included in the audio signals, wherein the voice signal is associated with a hearing device user; and using the detected voice signal to determine whether the keyword is included in speech represented in the audio signals.

13. A non-transitory computer-readable medium storing instructions that when executed by a processor of a hearing device cause the hearing device to perform operations, the operations comprising:

detecting, by a voice detection unit, a voice of a hearing device user, the voice detection unit configured to identify voice signals generated based on the voice of the hearing device user from other audio signals;

receiving a listening initiator with context-information that prompts the hearing device to convert received sound into audio signals, the context-information limiting keywords that the hearing device recognizes in a given context;

determining that the context-information includes first context-information, the first context-information associated with a first time period for listening for a keyword;

accessing, in a memory of the hearing device and based on the first context-information of the listening initiator, the keyword associated with an utterance of the hearing device user; and analyzing, by the processor of the hearing device during the first time period and using a speech recognizer module, the audio signals to determine whether the keyword associated with the utterance is included in the received sound, wherein:

the speech recognizer module only recognizes a limited number of keywords associated with the first context-information and the first time period;

the hearing device uses the context-information to determine keywords to listen for and a time period to listen for based on the context-information;

the hearing device determines whether a specific keyword or keywords are included in speech of the hearing device user during a certain time period; and the hearing device is predictive and anticipates intentions of the hearing device user.

14. The non-transitory computer-readable medium of claim 13, wherein:

the keyword is a first keyword;

the utterance is a first utterance; and the operations further comprise:

analyzing the audio signals to determine whether the first keyword and a second keyword associated with a second utterance are included in the received sound.

15. The non-transitory computer-readable medium of claim 13, wherein accessing the keyword associated with the utterance includes using the first context-information to perform a lookup operation in the memory of the hearing device.

16. The non-transitory computer-readable medium of claim 13, wherein analyzing the audio signals further comprises:

detecting a voice signal included in the audio signals, wherein the voice signal is associated with a wearer of the hearing device; and using the detected voice signal to determine whether the keyword is included in speech represented in the audio signals.

17. The non-transitory computer-readable medium of claim 13, the operations further comprising:

determining that the time limit has expired; and turning off speech recognition or returning the speech recognition to a normal mode, wherein in the normal mode the speech recognition does not use the first context-information from a wireless communication device to determine whether the keyword is included in the received sound.

18. The non-transitory computer-readable medium of claim 13, the operations further comprising:

receiving a signal from a sensor on the hearing device; and based on the received signal and the first context-information, determining the whether the keyword is included in the received sound.

* * * * *